INVENTOR.
ALBERT F. WOODFORD
BY
Edward M Fisher
ATTORNEY.

April 6, 1937. A. F. WOODFORD 2,076,056
POWER MOWER
Filed Nov. 28, 1934 3 Sheets-Sheet 3

INVENTOR.
ALBERT F. WOODFORD
BY
Edward M. Fisher
ATTORNEY.

Patented Apr. 6, 1937

2,076,056

UNITED STATES PATENT OFFICE 2,076,056

POWER MOWER

Albert F. Woodford, St. Petersburg, Fla.

Application November 28, 1934, Serial No. 755,087

2 Claims. (Cl. 56—25)

My invention relates to improvements in power mowers and the principal object of my invention is to provide a mower with an actuated cutting member in combination with a mower or implement which may be power driven either forward or backward.

A further object of my invention is to provide a mower wherein it is unnecessary to shut off the power to stop the rotating of the cutting member or the propulsion of the mower.

Another object of my invention is to provide a means by which the mower, under power, may be driven either forward or backward without the rotating of the cutting member.

This mower is principally designed for lawns and where it is desired to cut close to trees, shrubbery, et cetera, but it may also be used for heavier work, and aside from the objects set forth it will be found from the drawings and description that there are other novel advantages to my invention.

These various objects and advantages are attained by mechanism illustrated in the accompanying drawings, wherein, Figure 1 is a plan view of my invention as it appears when moving forward and the cutter is rotating.

In describing the invention in detail reference will be had to the accompanying drawings wherein like characters denote like or corresponding parts throughout the several views.

Figure 1:
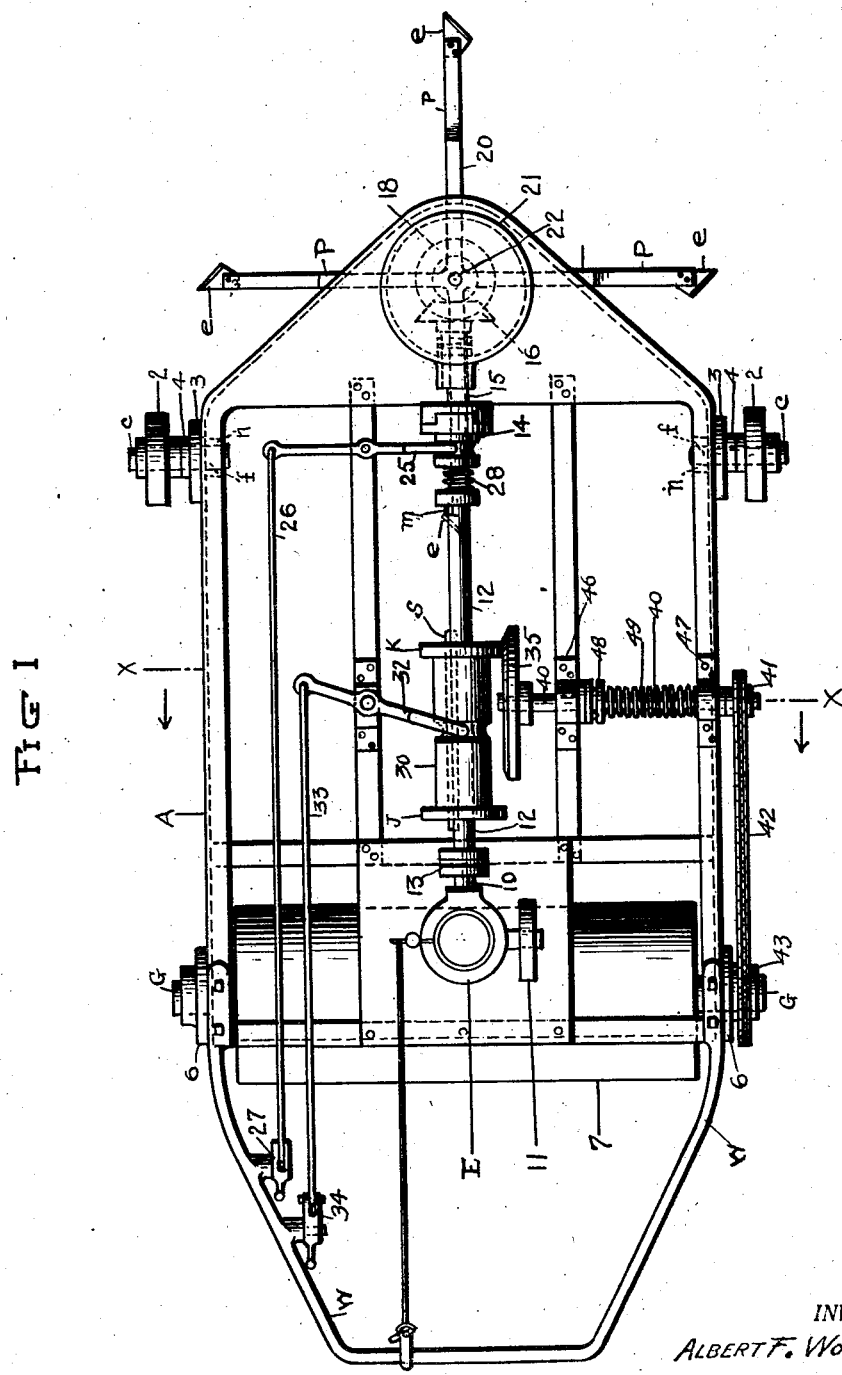
Figure 2:
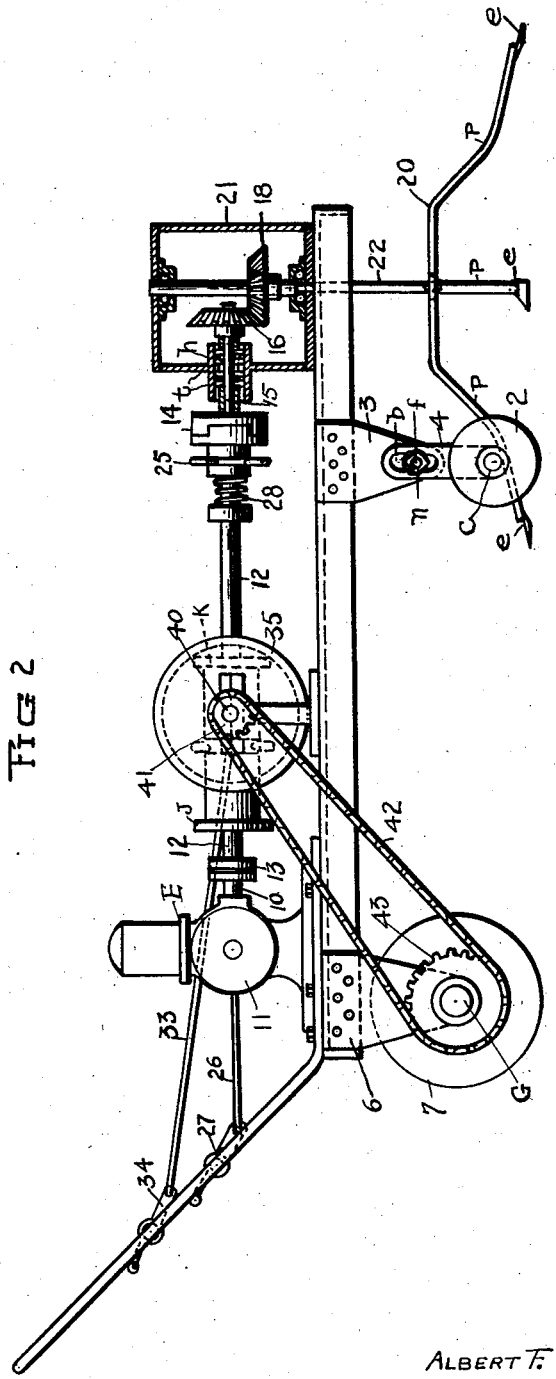
Figure 2 is a side elevation of my mower when it is in the same relative position as in Figure 1.

In these drawings A represents the main frame, which as shown is of suitable angle iron, mounted in the front upon wheels 2 through members 3 and 4 and a stub axle or bolt c, member 4 having an elongated slot b through which extends a bolt f thus allowing for the raising or lowering of said wheels 2, thereby adjusting the cutting member for high or close cutting and when the desired adjustment has been made said members are held rigidly in place by the tightening of a nut n upon said bolt. In the rear I support my frame A through member 6 upon a roller 7 which acts as a traction wheel as well as performing the function of a roller through means which will hereafter be described.

Upon the frame A is mounted by bolts or other suitable means an internal combustion engine E having a driving medium 10, which is provided with the usual balance wheel or fly wheel 11, connected to a longitudinal drive shaft 12 by a flexible coupling 13, thus retarding vibration, the said drive shaft extending to the clutch member 14 which is slidable and rotatable upon said shaft through the use of a key m and a yoke 25, connecting rod 26, control lever 27 suitably mounted upon the handle member w, and spring 28 is provided to engage or disengage the said clutch member, extending from said clutch and forming a part thereof is a shaft 15 having secured at its opposite end by a key and set screw a gear 16 thus transmitting power, when the clutch is engaged, to the cutting member 20 through the means of a gear 18 and shaft 22 upon which said gear 18 is mounted by a key and set screw and meshed with gear 16. To prevent vibration of shaft 15 I provide thrust bearings t which are engaged in a bearing housing h which is a part of the gear housing 21.

Figures 3, 4:
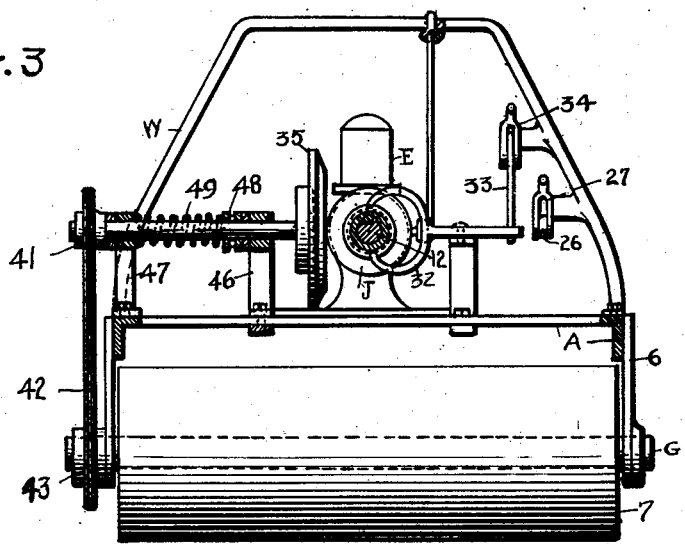
Figure 3 is a cross section on the line X—X, Figure 1.
Figure 4 is an enlarged detail view of the cutter showing four arms upon which the blades are mounted, but for heavier work two blades would prove satisfactory.

Shaft 22, which is perpendicular to said shaft 15, at its points of support rests upon ball bearings which are located at the top and bottom of gear housing 21 and turns free as the shaft revolves thereby eliminating friction and assuring a free rotary movement of the cutting member which is located at the lower end of said shaft and secured thereto by a bolt screwed into the tapered end of said shaft which projects through an opening 23 in said cutting member. As previously stated the cutting member for general lawn work will consist of four arms p but for heavy work two arms will prove satisfactory, upon each of these arms is riveted the cutting blades e it will be seen by referring to Figure 4 of the drawings that the bevel or cutting part of the blade is at an angle of approximately 45 degrees to the arm thus giving a cutting stroke similar to that of the common sickle. To transmit power from the longitudinal drive shaft 12 to the traction roller 7 I provide a collar 30 having disk members or shoulder ends j and k at its ends said collar being sleeved over the drive shaft 12 and made slidable thereon and rotatable therewith through the use of a key s. On the edge of said disk members or shoulders j and k is riveted a friction material to provide proper traction when, through the use of a yoke 32, connecting rod 33, and a control lever 34, suitably mounted upon the handle w one of said disk members or shoulders are moved into contact with the friction disk 35, which has riveted upon its face a suitable friction material, depending upon the desire of the operator to go forward or backward, or to stop the mower the operator disengages both members $j$ and $k$ from the disk 35 contact with the disk member or shoulder $k$ when in position as shown in Figure 1 providing a forward movement and contact with $j$ providing a backward movement.

It is therefore through the establishing of contact with one or the other of said disk members $j$ or $k$ with disk 35 and through shaft 40, which is at right angle to said longitudinal driving shaft and upon which said disk 35 is secured by a key and set screw, a sprocket wheel 41 mounted on and rotatable with shaft 40 through means of a key and set screw sprocket chain 42 and a sprocket wheel 43 which is mounted upon the axle G of roller 7 and held thereto by a key and set screw, that power is transmitted to the traction roller 7 causing propulsion of the mower.

Referring to the shaft 40 which is mounted on suitable bearings 46 and 47 Figure 1, it will be found that there is provided a thrust bearing 48 and spring 49 to resist the end thrust caused by the contacting of disk members or shoulders $j$ and $k$ with disk 35. The handle $w$ is mounted upon the frame A and secured thereto by bolts or other suitable means.

What I claim:—

1. In a power mower, a frame supported on wheels and a handle therefor, a traction member on said frame at the rear thereof, in combination with a longitudinal driving shaft mounted on said frame, power means for said shaft, friction members slidable on said shaft and rotatable therewith, a yoke engaging said friction members, a horizontal rotatable shaft at right angles to said driving shaft having a friction disk mounted upon one end thereof, control rods extending from said friction members to the handle for engaging and disengaging said members with said friction disk, a sprocket wheel mounted on the outer end of said horizontal shaft and rotatable therewith, a chain extending from said sprocket wheel to a second sprocket wheel mounted on one end of the traction member at the rear of said frame, in further combination with an independent means for controlling the transmission of power through said longitudinal driving shaft, a clutch mounted upon said shaft and controlled by a yoke engaging said clutch, control rods attached to said yoke extending therefrom to said frame handle, a vertical shaft positioned adjacent the front end of said frame, bevel gears at the forward end of the longitudinal driving shaft and on the upper end of said vertical shaft for providing a driving contact therebetween, a cutting member having a series of cutting blades mounted on the lower end of said vertical shaft, said cutting member to be rotated with said vertical shaft parallel to and adjacent to the ground.

2. In a power mower, the combination of a frame supported on wheels and a handle therefor, a traction member on said frame at the rear thereof, a power driven longitudinal shaft mounted upon said frame and having slidable thereon and rotatable therewith a collar with disk members at opposite ends thereof, a yoke member engaging said collar, a longitudinal shaft at right angles to said driving shaft and having a friction disk mounted thereon, control rods extending from said yoke along the side of the frame to said handle for engaging and disengaging said disk members with said friction disk, a sprocket wheel mounted on the outer end of said horizontal shaft and a sprocket chain extending from said sprocket wheel to a second sprocket wheel mounted at the rear of said frame in combination with an independent means for controlling the transmission of power through said longitudinal driving shaft, a clutch mounted on said shaft and controlled by a yoke engaging said clutch, control rods attached to said yoke and extending therefrom along the side of said frame to said handle, a vertical shaft positioned adjacent the front end of said frame, bevel gears on the forward end of the longitudinal driving shaft and on the upper end of said vertical shaft providing a driving engagement therebetween a cutting member on the lower end of said vertical shaft, said member comprising a series of arms having cutting blades mounted thereon at an angle of approximately forty five degrees thereto, said cutting member and blades being rotated with said vertical shaft parallel to and adjacent to the surface to be mowed.

ALBERT F. WOODFORD.